DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 21, 1972

904 O.G. 275

T904,023

DIRECT ADDITION OF MAGNESIUM-METAL TO A TURBINE ENGINE COMBUSTION CHAMBER

James A. Kelly and George B. Cobel, Midland, Mich., assignors to The Dow Chemical Company, Midland, Mich.

Filed Oct. 27, 1971, Ser. No. 193,107
Int. Cl. F02c *3/20, 7/30*
U.S. Cl. 60—39.02
No Drawing. 5 Pages Specification

A method to reduce or prevent the detrimental, corrosive effects attributable to gas turbine engine combustion products containing vanadium compounds. A magnesium alloy containing greater than about 80 weight percent and preferably greater than about 95 weight percent magnesium is introduced into the combustion chamber of a gas turbine engine. For optimum results, the alloy desirably is substantially free of vanadium. The metal can be in any solid form such as powder, chip, rod or wire; however, magnesium wire or rod is preferred.

The metal is fed into the combustion chamber substantially simultaneously with the turbine fuel. Generally, and preferably, the metal and fuel are fed through separate ports in the combustion chamber, but both the fuel and metal can be confluently passed into the combustion chamber at a regulated desired rate. A regulatable feed means, such as commonly used for wire in commercial welding apparatus, can be employed to insert the corrosion product inhibiting magnesium alloy into the turbine combustion chamber. The magnesium then combines with the fuel and combustion products to reduce or prevent the detrimental effects of the vanadium compounds.